United States Patent
Ryan

(10) Patent No.: US 9,460,161 B2
(45) Date of Patent: Oct. 4, 2016

(54) METHOD FOR DETERMINING RELEVANT SEARCH RESULTS

(71) Applicant: S.L.I. Systems, Inc., Christchurch (NZ)

(72) Inventor: Shaun William Ryan, Christchurch (NZ)

(73) Assignee: S.L.I. SYSTEMS, INC., Christchurch (NZ)

( * ) Notice: Subject to any disclaimer, the term of this patent is extended or adjusted under 35 U.S.C. 154(b) by 0 days.

(21) Appl. No.: 14/524,984

(22) Filed: Oct. 27, 2014

(65) Prior Publication Data

US 2015/0046290 A1  Feb. 12, 2015

(30) Foreign Application Priority Data

Dec. 8, 2010 (NZ) ........................................ 589787

(51) Int. Cl.
  G06F 17/30  (2006.01)
  G06Q 30/06  (2012.01)

(52) U.S. Cl.
CPC ....... *G06F 17/3053* (2013.01); *G06F 17/3097* (2013.01); *G06F 17/30864* (2013.01); *G06Q 30/0625* (2013.01)

(58) Field of Classification Search
CPC .................. G06F 17/30991; G06F 17/3053; G06F 17/30864; G06F 17/3097; G06F 17/30029; G06F 17/30587; G06F 17/3064; G06F 17/28; G06Q 30/0625; G06Q 30/0247; G06Q 30/0275; G06Q 30/02; G06Q 10/10; G06Q 30/0241; G06Q 30/0267; G06Q 40/04; G06Q 30/0269; G06Q 10/107; G06Q 30/256; G06Q 30/0277; H04L 67/306; G10L 13/027; G10L 15/265
USPC ....... 707/748, 708, 765, 767, 770, 769, 725, 707/723, 728, 727, 736, 719, 706, 749, 741, 707/E17.002, E17.032, E17.137, E17.014, 707/E17.017, E17.108, E17.084, 709, 707/E17.01; 705/26.62, 14.46, 14.42, 705/14.43, 14.47, 14.54; 715/777, 786, 715/835, 781, 854, 205

See application file for complete search history.

(56) References Cited

U.S. PATENT DOCUMENTS 6,564,213 B1   5/2003  Ortega et al.
6,691,108 B2 * 2/2004  Li .................... G06F 17/30864
                                                              707/710
(Continued)

FOREIGN PATENT DOCUMENTS

WO    WO 2009/152441 A1   12/2009

OTHER PUBLICATIONS

Robert A. Joyce, Judson Powers, Frank Adelstein—"MEGA: A tool for Mac OS X operating system and application forensics" Digital Investigation—vol. 5, Supplement, Sep. 2008, pp. S83-S90—The Proceedings of the Eighth Annual DFRWS Conference.*

(Continued)

*Primary Examiner* — Anh Ly
(74) *Attorney, Agent, or Firm* — Moore & Van Allen PLLC; Henry B. Ward, III

(57) ABSTRACT

Systems and methods for determining search results. The method may include receiving an at least partial search term, and identifying keywords based on the at least partial search term, wherein each keyword has an associated keyword measure based on the number of times each keyword has been previously searched for within a predetermined time period. For each keyword search results associated with the keyword may be identified, wherein each result has an associated search measure. A relevance measure may be determined for each result using the keyword measure the search measure, and used to provide at least one of the results as a search result for the at least partial search term.

9 Claims, 3 Drawing Sheets

(56) References Cited

U.S. PATENT DOCUMENTS

| | | | |
|---|---|---|---|
| 7,725,422 B2 | 5/2010 | Ryan et al. | |
| 7,788,248 B2 | 8/2010 | Forstall et al. | |
| 8,024,335 B2* | 9/2011 | Anthony | G06F 17/30587 |
| | | | 707/729 |
| 8,135,712 B1 | 3/2012 | Coladonato et al. | |
| 8,484,184 B2 | 7/2013 | Teran et al. | |
| 8,484,208 B1* | 7/2013 | Raghavan | G06F 17/30941 |
| | | | 707/728 |
| 2003/0130994 A1* | 7/2003 | Singh | G06F 17/30867 |
| | | | 707/E17.008 |
| 2004/0199397 A1* | 10/2004 | Dresden | 705/1 |
| 2005/0021440 A1* | 1/2005 | Dresden | 705/37 |
| 2005/0203888 A1 | 9/2005 | Woosley et al. | |
| 2006/0004739 A1* | 1/2006 | Anthony | G06F 17/30587 |
| | | | 707/E17.108 |
| 2006/0106769 A1 | 5/2006 | Gibbs | |
| 2006/0195428 A1* | 8/2006 | Peckover | 707/3 |
| 2006/0206454 A1* | 9/2006 | Forstall | G06F 17/30864 |
| | | | 707/E17.108 |
| 2007/0214131 A1 | 9/2007 | Cucerzan et al. | |
| 2008/0021878 A1* | 1/2008 | Jeong | 707/3 |
| 2008/0021884 A1 | 1/2008 | Jones et al. | |
| 2008/0133505 A1* | 6/2008 | Bayley | G06F 17/30864 |
| | | | 707/E17.108 |
| 2008/0140644 A1* | 6/2008 | Franks | G06F 17/30817 |
| | | | 707/E17.108 |
| 2008/0148193 A1* | 6/2008 | Moetteli | 715/854 |
| 2009/0063462 A1 | 3/2009 | Alfonseca et al. | |
| 2009/0106225 A1* | 4/2009 | Smith et al. | 707/5 |
| 2009/0228817 A1 | 9/2009 | Adams et al. | |
| 2009/0271374 A1 | 10/2009 | Korn et al. | |
| 2009/0299853 A1 | 12/2009 | Jones et al. | |
| 2010/0057716 A1* | 3/2010 | Stefik | G06F 17/3071 |
| | | | 707/E17.108 |
| 2010/0082634 A1* | 4/2010 | Leban | 707/741 |
| 2010/0138292 A1* | 6/2010 | Park et al. | 705/14.46 |
| 2010/0205541 A1* | 8/2010 | Rapaport | G06Q 10/10 |
| | | | 715/753 |
| 2010/0223247 A1* | 9/2010 | Wurzer | G06F 17/30731 |
| | | | 707/706 |
| 2010/0325100 A1 | 12/2010 | Forstall et al. | |
| 2011/0055185 A1 | 3/2011 | Bitan et al. | |
| 2011/0191332 A1* | 8/2011 | Barve | G06F 17/30 |
| | | | 707/723 |
| 2011/0202520 A1* | 8/2011 | Teran | G06F 17/30973 |
| | | | 707/708 |
| 2011/0307498 A1* | 12/2011 | McFarlane | G06F 17/30864 |
| | | | 707/749 |
| 2012/0123855 A1 | 5/2012 | Gu | |
| 2012/0226678 A1* | 9/2012 | Park et al. | 707/709 |
| 2013/0138429 A1* | 5/2013 | Shen | G06F 17/30672 |
| | | | 704/9 |
| 2013/0246406 A1 | 9/2013 | McFarlane et al. | |
| 2013/0325839 A1* | 12/2013 | Goddard | G06F 17/30867 |
| | | | 707/708 |
| 2015/0317317 A1* | 11/2015 | Deng | G06F 17/3053 |
| | | | 707/748 |

OTHER PUBLICATIONS

Ioannis Psarras and Joemon Jose—"Evaluating a Personal Information Assistant" Published in: Proceeding RIAO '07 Large Scale Semantic Access to Content (Text, Image, Video, and Sound)—pp. 274-286—Le Centre De Hautes Etudes Internationales D'Informatique Documentaire Paris, France, France © 2007.*

U.S. Appl. No. 13/315,086; Entitled: Method for Determining Relevant Search Results; filed Dec. 8, 2011.

* cited by examiner

METHOD FOR DETERMINING RELEVANT SEARCH RESULTS

CROSS-REFERENCES AND RELATED APPLICATIONS

This application is a Continuation of U.S. application Ser. No. 13/315,086, entitled, METHOD FOR DETERMINING RELEVANT SEARCH RESULTS, filed on Dec. 8, 2011, the entire contents of which is hereby incorporated by reference in its entirety and priority is claimed under 35 U.S.C. §120. As in the parent application Ser. No. 13/315,086, priority is also claimed to New Zealand Patent Application Number 589787, filed 8 Dec. 2010, the entire contents of which is hereby incorporated by reference in its entirety, under 35 U.S.C. §

TECHNICAL FIELD

The present invention relates to a method of determining relevant search results. In particular the present invention relates to determining relevant search results for keywords suggested following receiving an at least partial search term.

BACKGROUND ART

With internet access becoming more readily available, and users becoming more sophisticated in the use of same, searching for data has become a key aspect of the online experience. This has had a particular impact on those operating in the area of electronic commerce (e-commerce), from parties such as online retailers seeking to make their stock more readily accessible, to search engine providers looking to capitalise on such demand by providing a service.

There are a wide array of existing techniques intended to enable a search engine user to quickly and easily locate or identify relevant results. These include ranking search results for a keyword based on the frequency with which users have selected the result following a search, or auto-completion of partially entered search terms, among many others.

U.S. Pat. No. 6,564,213 describes one such system and associated methods for suggesting auto-completion strings to users during entry of search terms. The suggested strings are based on attributes such as popularity (resulting in the best-selling product, or most frequently accessed link) specific to the database being searched. Such a method still requires users to conduct the search before gaining access to potentially relevant results.

The provision of relevant results is particularly important to online retailers, where the ease with which a customer can find a desired product or service can directly correlate to sales, and customer loyalty.

With the normalisation of e-commerce and the increasing number of online retailers and searching providers being established, competition to gain or maintain market share is intensifying. With users becoming more sophisticated and critical of website appearance and functionality, any improvement or innovation can be useful in gaining a competitive edge.

In particular, minimising the number of steps, or amount of time it takes for a user to gain access to relevant results, could be useful. Even providing a point of difference in searching functionality could be a significant advantage.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to one aspect of the present invention there is provided a computer implemented method for determining search results, comprising the steps of:
  receiving an at least partial search term;
  identifying keywords based on the at least partial search term, wherein each keyword has an associated keyword measure based on the number of times each keyword has been previously searched for within a predetermined time period;
  for each keyword:
    identifying search results associated with the keyword, wherein each result has an associated search measure; and
    determining a relevance measure for each result using the keyword measure and the search measure; and
  providing at least one of the results as a search result for the at least partial search term based on the corresponding relevance measure.

According to another aspect of the present invention there is provided a computer program product, tangibly embodied on a machine readable medium, the computer program product comprising instructions that, when read by a machine, operate to cause data processing apparatus to:
  receive an at least partial search term;
  identify keywords based on the at least partial search term, wherein each keyword has an associated keyword measure based on the number of times each keyword has been previously searched for within a predetermined time period;
  for each keyword:
    identify search results associated with the keyword, wherein each result has an associated search measure; and
    determine a relevance measure for each result using the keyword measure and the search measure; and
  provide at least one of the results as a search result for the at least partial search term based on the corresponding relevance measure.

According to another aspect of the present invention there is provided a system comprising:
at least one processor; and
at least one storage device storing processor-executable instructions that, when executed by the at least one processor, cause the at least one processor to perform operations comprising:
receiving an at least partial search term;
identifying keywords based on the at least partial search term, wherein each keyword has an associated keyword measure based on the number of times each keyword has been previously searched for within a predetermined time period;
for each keyword:
identifying search results associated with the keyword, wherein each result has an associated search measure; and
determining a relevance measure for each result using the keyword measure and the search measure; and
providing at least one of the results as a search result for the at least partial search term based on the corresponding relevance measure.

In this context, "keyword" will be understood to mean a searchable word in an online record or database. Typically, a keyword is a complete word or phrase that relates to the at least partial search term. For example, the keyword may be an extension of the partial search term, or a corrected spelling thereof, or a combination. Alternatively, the keyword may be a synonym of the search term.

It should be appreciated that the at least partial search term may be an empty string, having no characters, as known in the art. In this case, all keywords available to the system would be identified as being based on the search term and subsequently used in providing at least one of the results as a search result based on the relevance measure.

Reference to a keyword measure should be understood to mean a quantified representation of the likelihood of a keyword being relevant to a user conducting a search. For example, the keyword measure may indicate the likelihood of the keyword being the intended search term in view of the at least partial search term.

In a preferred embodiment the keyword measure may relate to popularity of the keyword. This may be determined by any number of methods known to those skilled in the art. For example, popularity may reflect the number of times a keyword has been entered into the text entry field within a predetermined time period. This may be a time weighted calculation, with more recent searching being given a higher weighting.

The keyword measure may also be based on or influenced by the selection of the keyword following presentation in a list of suggested keywords, using a similar concept to the invention described in the Applicant's U.S. Pat. No. 7,725,422.

Similarly, the search measure may be any way by which the likelihood of a search result being relevant to a keyword may be quantified. For example, the search measure may be influenced or based on the number of times a search result is selected following a keyword search, or by ratings manually given by a user according to their perceived relevance of the result.

While the present invention may have particular application to online retailers and site specific search engines, it is envisaged that it may be utilised by broader searching applications. As such, the search result may be any virtual object such as a website, a product name or associated webpage, or a catalogue, to which a user may be directed, or open in a new tab or window.

Each search result is preferably represented by a unique identifier, for example a URL, such that results relating to more than one keyword can be identified to avoid repetition of search results for the at least partial search term.

It is envisaged that the calculation for determining a relevance measure for each result may comprise multiplication of the keyword measure by the search measure. It should be appreciated that this is not intended to be limiting, and other calculations involving the keyword measure and search measure may be used.

In a preferred embodiment, the search results are ranked according to relevance measure.

Preferably, an overall relevance measure for a result appearing in the search results associated with more than one keyword is determined by summing the relevance measures determined for the result in relation to each keyword.

It should be appreciated that the steps of the invention may be performed, for example, by a website, or by a search module associated with or external to the website.

In a preferred embodiment, a list of most relevant results for the at least partial search term is displayed together with a list of suggested keywords for potential selection by the user. It should be appreciated that while it is envisaged that the most relevant results may be presented in order of ranking, this should not be considered a limitation.

In the example of a product, each result being displayed may comprise an image of the product, and a description of the product.

It is envisaged that in one embodiment this display may be on a dropdown display beneath the search form, with the relevant results being displayed below the list of suggested keywords.

Alternative embodiments include showing the relevant results without the keywords, or displaying the results in other positions relative to the keywords, As continuations or updates of the partial search term, or a new at least partial search term, are received the suggested keywords and therefore most relevant results may be dynamically re-identified or redetermined and displayed accordingly.

It is envisaged that a user highlighting a suggested keyword (whether hovering over the keyword or scrolling down the list) may cause the associated keyword measure to be temporarily increased. In turn, this may influence the most relevant search results presented at that time.

A person skilled in art should appreciate that limitations to the precise number of suggested keywords, search results associated with the keyword, or contained in the list of most relevant results are not significant to working of the present invention. Although there is likely to be a degree of diminishing returns, the predominant influence on these factors will be a particular provider's capabilities and desired specifications.

Monitoring of a graphical user interface such as a text entry field, or search form, for entry of an at least partial search term and suggesting relevant keywords may be achieved by any suitable means known to a person skilled in the art. Such functionality is commonly known as "autocompletion", and may be referred to as such throughout the present specification.

Preferably, the keywords are retrieved from a database of previously used search terms. For example, the database may comprise previously used search terms for the website being used, or any other website.

However, there are many techniques known in the art for suggestion or auto-completion of keywords based on entries into a search form. It should be appreciated that the present invention may utilise any number of algorithms or strategies to achieve this functionality, and particular embodiments have been described for the purposes of clarity.

Similarly, the creation and maintenance of database structures storing keywords, search results, and associated data such as the keyword measures, search measures, and relevance measures may be achieved using any suitable means known to a person skilled in the art.

For a firmware and/or software (also known as a computer program) implementation, the techniques of the present invention may be implemented as instructions (for example, procedures, functions, and so on) that perform the functions described. It should be appreciated that the present invention is not described with reference to any particular programming languages, and that a variety of programming languages could be used to implement the present invention. The firmware and/or software codes may be stored in a memory, or embodied in any other processor readable medium, and executed by a processor or processors. The memory may be implemented within the processor or external to the processor.

A general purpose processor may be a microprocessor, but in the alternative, the processor may be any processor, controller, microcontroller, or state machine. A processor may also be implemented as a combination of computing devices, for example, a combination of a digital signal processor (DSP) and a microprocessor, a plurality of microprocessors, one or more microprocessors in conjunction with a DSP core, or any other such configuration. The processors may function in conjunction with servers and network connections as known in the art.

The steps of a method, process, or algorithm described in connection with the present invention may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The present invention provides at least the following advantages:
  Increased conversion rate as the result of people being more likely to find a particular product; and
  Increased user satisfaction by enabling them to identify a desired result more rapidly.

BRIEF DESCRIPTION OF THE DRAWINGS

Further aspects of the present invention will become apparent from the ensuing description which is given by way of example only and with reference to the accompanying drawings in which.

DETAILED DESCRIPTION OF THE INVENTION

Figure 1:
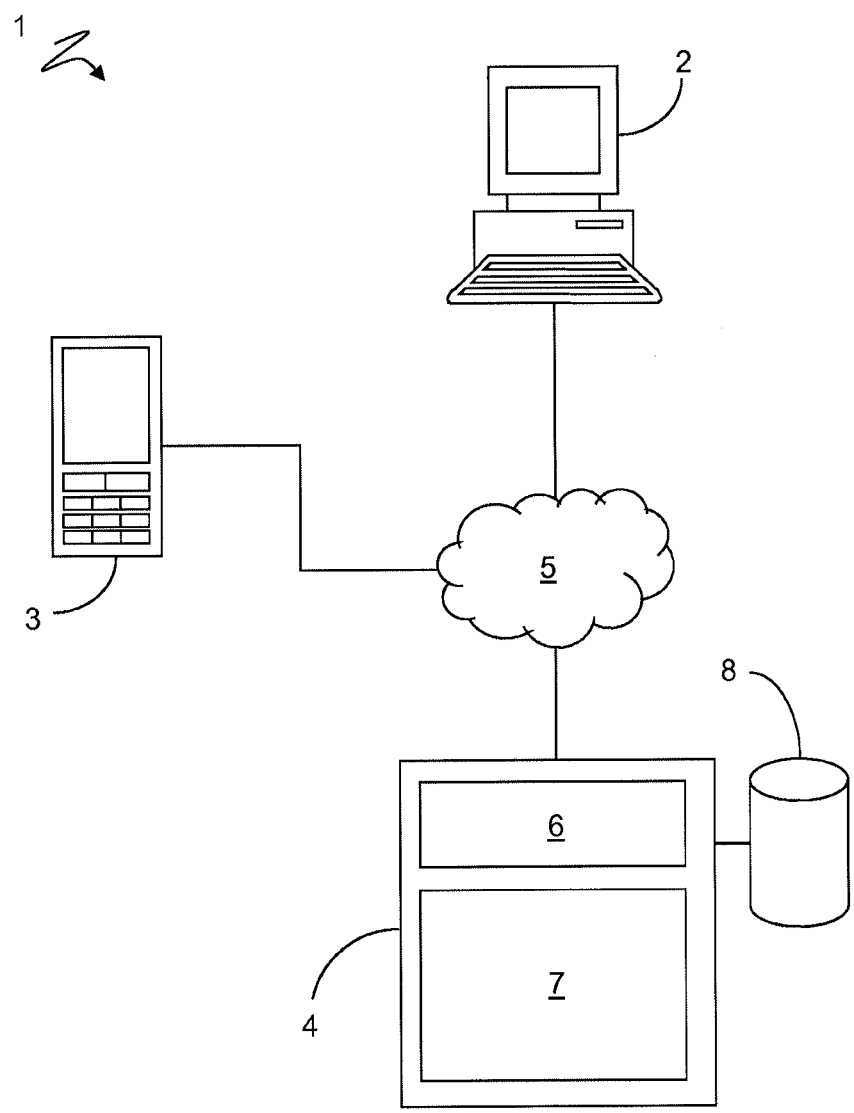
FIG. 1 is a block diagram illustrating an environment in which one embodiment of the present invention may be implemented.

FIG. 1 illustrates a system (1) in which one embodiment of the present invention may be implemented.

The system (1) includes user devices such as personal computer (2) and mobile phone (3). The user devices may communicate with a server device (4) over a network (5)—for example the Internet.

The server device (4) includes a processor (6) coupled to processor memory (7). The memory (7) contains a program for performing the method described with reference to FIG. 2 when executed by the processor (6). The server device (4) may also access a database (8) storing search terms, keywords, keyword measures, search results, search measures, and relevance measures in accordance with an embodiment of the present invention.

It should be appreciated that the system (1) illustrated is not intended to be limiting, and that the present invention may be implemented using alternative architecture as known in the art. For example, the functionality of the server device (4) may be allocated across a plurality of devices, or comprise a plurality of processors.

Figure 2:
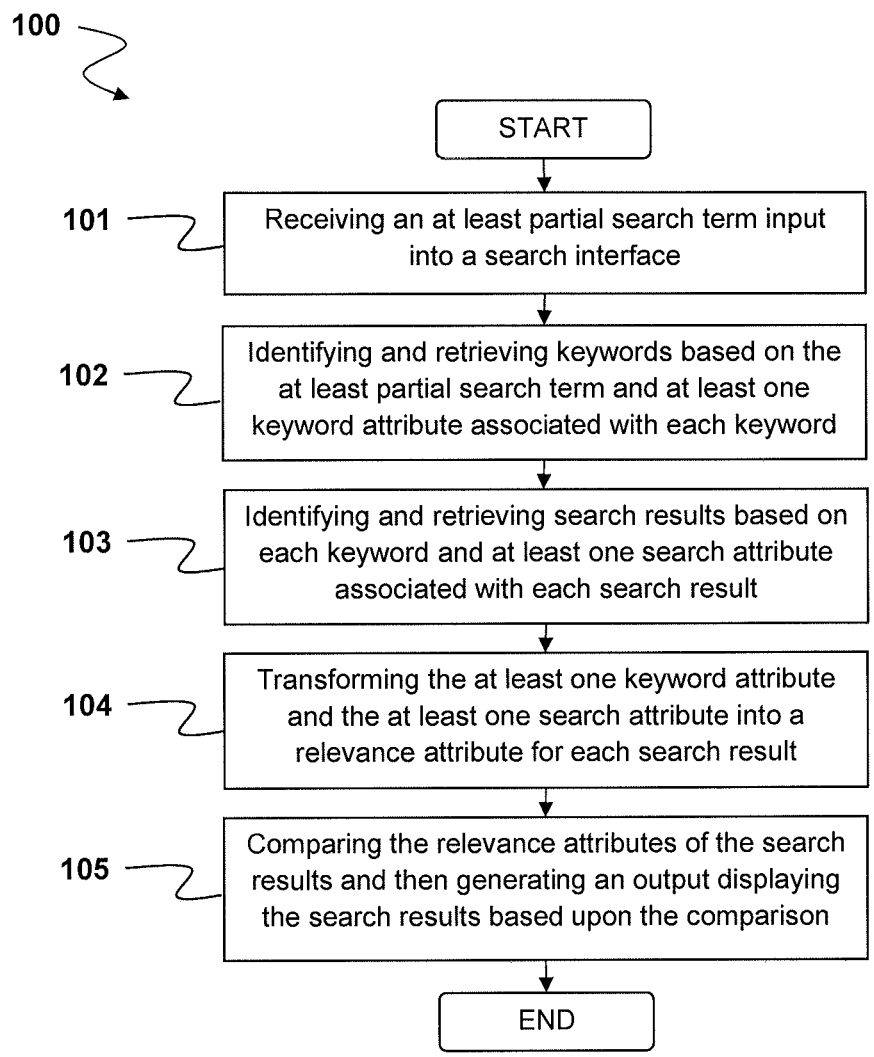
FIG. 2 is a flow diagram illustrating a method in accordance with an embodiment of the present invention.

FIG. 2 is a flow diagram illustrating a method (generally illustrated by arrow 100) for determining relevant results following reception of an at least partial search term.

The method (100) begins at step 101, where an at least partial search term is received. For example, a user enters the partial search term "VIT" into a text box providing a search field in a health product website, such as described below in relation to FIG. 2. The website recognises that text has been provided and passes the text or string to a search module.

At step 102, a number of suggested keywords based on the at least partial search term are identified, the keywords being retrieved from a database of previously used search terms. For example, in response to the partial search term "VIT", the keywords "vitamin d", "vitamin b complex", "hair vitamins", "vitamin e" and "prenatal vitamins" are identified. Each keyword has an associated keyword measure based on the number of times the keyword has been searched for previously.

For each keyword:
  a number of search results associated with the keyword are identified (step 103). Such search results are possible search results should the keyword be used as a search term. Using the example keyword "vitamin d", results include those products sold by the website which are directed to, or at least include, vitamin d. Each result has an associated search measure indicating the frequency with which the result is selected following a search for the keyword; and
  a relevance measure for each result is determined (step 104) by multiplying the keyword measure by the search measure.

In the example, a number of possible search results for each of the keywords "vitamin d", "vitamin b complex", "hair vitamins", "vitamin e" and "prenatal vitamins" are identified. The keyword measure is multiplied by the search measure associated with each possible search result to determine a relevance measure for each possible search result. In this embodiment, the possible search results are ranked in order of relevance measure.

At step 105, at least one of the results is provided to the website for presentation as a search result for the at least partial search term. For example, the top five possible search results by relevance measure are provided for presentation as a search result for the at least partial search term.

The following example illustrates associations between the various integers of the present invention, where k=a keyword, km=a keyword measure, sr=a search result, and sm=a search measure.

k1, km1: (sr11, sm11), (sr12, sm12) . . . , (sr1N, sr1N);
k2, km2: (sr21, sm21), (sr22, sm22) . . . ; and
k3, km3: (sr31, sm31), (sr12, sm32) . . . .

For each search result, a relevance, or overall relevance measure (rm) may be determined as follows:

rm_sr11=km1*sm11;
rm_sr12=(km1*sm12)+(km3*sm32); and so on. The latter example illustrates one way of calculating the relevance measure of a search result where the same search result is associated with more than one keyword.

Figure 3:
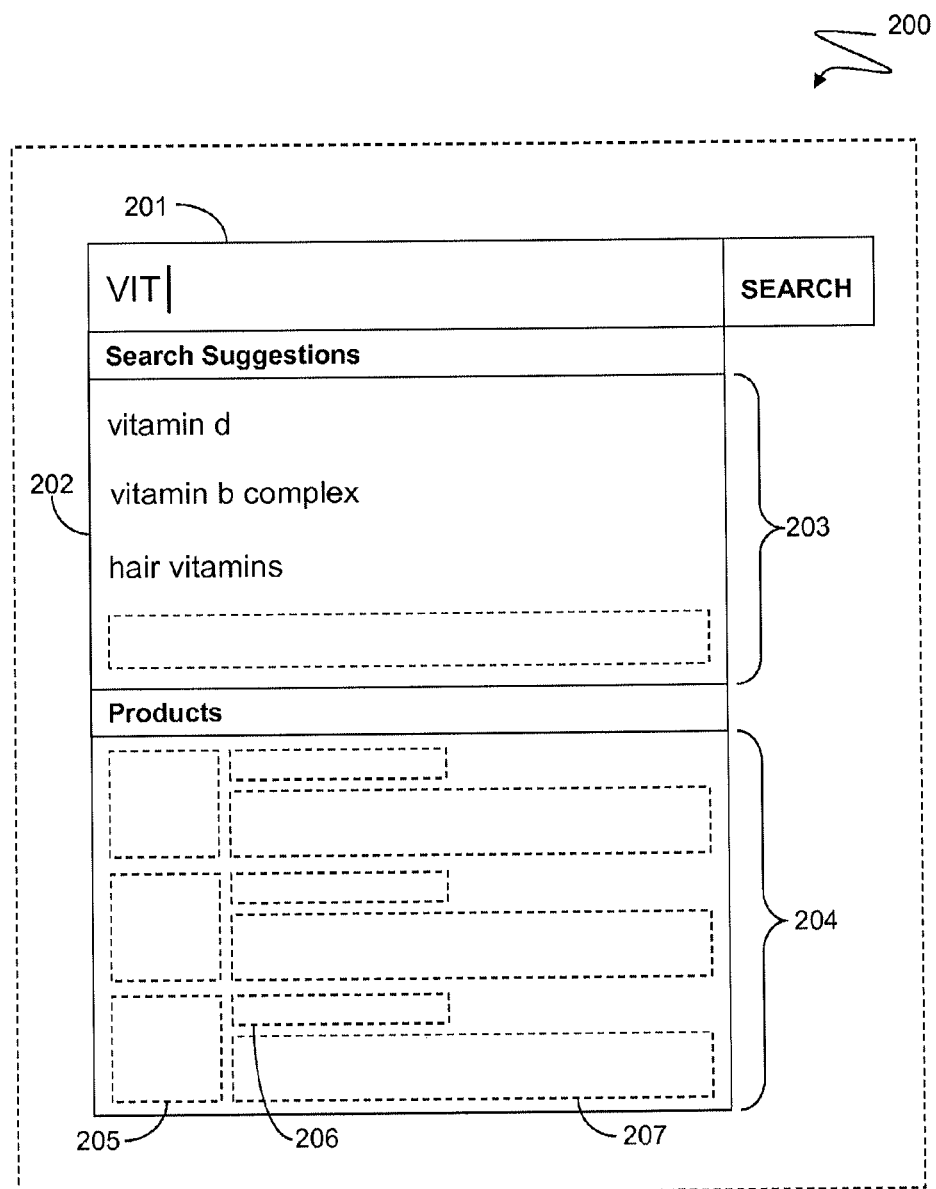
FIG. 3 is an illustration of a webpage displayed in accordance with another embodiment of the present invention.

FIG. 3 illustrates a portion of a webpage (generally indicated by arrow 200) for presenting suggested keywords and relevant results to a user.

The webpage (200) comprises a search form (201) into which a user may enter a search term.

Once the user begins to enter a search term, for example "VIT", into the search form (201), the method as described in relation to FIG. 1 is performed, and a dropdown box (202) is presented.

The dropdown box (202) comprises a list of suggested keywords (203), for example "vitamin d", "vitamin b complex", and "hair vitamins", each of which may be selected by the user.

The dropdown box (202) also comprises a list of most relevant results (204) associated with the keywords, each of which may also be selected by the user. The most relevant results are based on the relevance measure which, in some embodiments, is the sum of the products of the associated keyword measure and corresponding search measure.

Each result within the list of relevant results (204) comprises an image (205) of a product associated with the result, the title or label (206) of the product, and a description (207) of the product.

Aspects of the present invention have been described by way of example only and it should be appreciated that modifications and additions may be made thereto without departing from the scope thereof as defined in the appended claims.

What I claim is:

1. A computer implemented method for determining search results, comprising the steps of:
   receiving, by a computer processing device, an at least partial search term input into a search interface;
   accessing a database to identify and retrieve keywords based on the at least partial search term and at least one keyword attribute associated with each keyword, wherein the at least one keyword attribute is based on the number of times each keyword has been previously searched for within a predetermined time period, and communicating the keywords and at least one keyword attributes to a relevance server comprising a computer processing device;
   accessing the database to identify and retrieve search results based on each keyword and at least one search attribute associated with each search result and communicating the search results and at least one search attributes to the relevance server;
   processing, at the relevance server, the keywords and at least one keyword attributes and the search results and at least one search attributes, the processing step comprising:
   transforming the at least one keyword attribute and the at least one search attribute into a relevance attribute for each search result,
   comparing the relevance attributes of the search results, and
   then generating an output, by a computer processing device, displaying at least one of the search results based upon the results of the comparison of the relevance attributes of the search results and at least one of the retrieved keywords for selection by a user in conjunction with the displayed search results;
   receiving, at the relevance server, notification that one of the displayed keywords has been highlighted by the user; and
   processing the notification to transform the keyword attribute associated with the highlighted keyword into a higher weighted keyword attribute.

2. The method of claim 1, wherein the keyword attribute is time weighted to give more recently searched for keywords a higher weighting.

3. The method of claim 1, wherein the search attribute is based on the number of times a search result is selected following a keyword search.

4. The method of claim 1, wherein the relevance attribute for each result is transformed by multiplying the respective keyword attribute by the respective search attribute.

5. The method of claim 1, further comprising: where a retrieved search result is associated with a plurality of retrieved keywords, transforming the associated plurality of relevance attributes into a single overall relevance attribute.

6. The method of claim 1, further comprising ranking the search results for the at least partial search term according to the transformed relevance attribute.

7. The method of claim 1, further comprising:
   receiving, by a computer processing device, entry of additional characters to the at least partial search term to transform it into an updated at least partial search term;
   accessing the database to identify and retrieve keywords and at least one keyword attribute associated with each keyword, based on the updated at least partial search term;
   accessing the database to identify and retrieve search results based on the keywords retrieved based on the updated at least partial search term, and at least one search attribute associated with each search result; and
   processing, at the relevance server, the keywords and at least one keyword attributes and the search results and at least one search attributes, comprising:
   generating an output, by a computer processing device, updating the search results displayed to reflect any changes following the entry of additional characters to the at least partial search term.

8. One or more computer-storage media storing computer-useable instructions that, when used by one or more computing devices, cause the one or more computing devices to perform a method of determining search results, the method comprising:
   receiving, by a computer processing device, an at least partial search term input into a search interface;
   accessing a database to identify and retrieve keywords based on the at least partial search term and at least one keyword attribute associated with each keyword, wherein the at least one keyword attribute is based on the number of times each keyword has been previously searched for within a predetermined time period, and communicating the keywords and at least one keyword attributes to a relevance server comprising a computer processing device;

accessing the database to identify and retrieve search results based on each keyword and at least one search attribute associated with each search result and communicating the search results and at least one search attributes to the relevance server;

processing, at the relevance server, the keywords and at least one keyword attributes and the search results and at least one search attributes, the processing step comprising:

transforming the at least one keyword attribute and the at least one search attribute into a relevance attribute for each search result, comparing the relevance attributes of the search results, and then generating an output, by a computer processing device, displaying at least one of the search results based upon the results of the comparison of the relevance attributes of the search results and at least one of the retrieved keywords for selection by a user in conjunction with the displayed search results;

receiving, at the relevance server, notification that one of the displayed keywords has been highlighted by the user; and processing the notification to transform the keyword attribute associated with the highlighted keyword into a higher weighted keyword attribute.

9. A system for determining search results, the system comprising:

a computing device associated with a search service having one or more computer processing devices and one or more computer-storage media; and at least a database and a relevance server coupled with the search service, wherein the search service:

receives, by a computer processing device, an at least partial search term input into a search interface, accesses the database to identify and retrieve keywords based on the at least partial search term and at least one keyword attribute associated with each keyword, wherein the at least one keyword attribute is based on the number of times each keyword has been previously searched for within a predetermined time period, and communicates the keywords and at least one keyword attributes to the relevance server, accesses the database to identify and retrieve search results based on each keyword and at least one search attribute associated with each search result and communicating the search results and at least one search attributes to the relevance server, processes, at the relevance server, the keywords and at least one keyword attributes and the search results and at least one search attributes, the processing step comprising:

transforming the at least one keyword attribute and the at least one search attribute into a relevance attribute for each search result, comparing the relevance attributes of the search results, and then generating an output, by a computer processing device, displaying at least one of the search results based upon the results of the comparison of the relevance attributes of the search results and at least one of the retrieved keywords for selection by a user in conjunction with the displayed search results, receives, at the relevance server, notification that one of the displayed keywords has been highlighted by the user, and processes the notification to transform the keyword attribute associated with the highlighted keyword into a higher weighted keyword attribute.

\* \* \* \* \*